(12) United States Patent
Rudolph

(10) Patent No.: US 7,740,500 B2
(45) Date of Patent: Jun. 22, 2010

(54) ELECTRICAL PLUG CONNECTOR

(75) Inventor: Paul Rudolph, Stuttgart (DE)

(73) Assignee: CONINVERS GmbH, Herrenberg (DE)

( * ) Notice: Subject to any disclaimer, the term of this patent is extended or adjusted under 35 U.S.C. 154(b) by 0 days.

(21) Appl. No.: 12/418,337

(22) Filed: Apr. 3, 2009

(65) Prior Publication Data
US 2010/0112870 A1    May 6, 2010

(30) Foreign Application Priority Data
Nov. 4, 2008    (DE) .................. 20 2008 014 604 U

(51) Int. Cl.
    H01R 13/64    (2006.01)
(52) U.S. Cl. ...................... 439/372; 439/596
(58) Field of Classification Search .......... 439/157, 439/345, 372, 582, 596, 660
See application file for complete search history.

(56) References Cited

U.S. PATENT DOCUMENTS

| 4,820,186 | A | 4/1989 | Fujii |
| 4,880,391 | A | 11/1989 | Hurtgen |
| 5,643,009 | A | 7/1997 | Dinkel et al. |
| 6,231,365 | B1 | 5/2001 | Konno et al. |
| 7,422,478 | B2 | 9/2008 | Zugel et al. |

FOREIGN PATENT DOCUMENTS

| DE | 20 2004 012 952 | 10/2004 |
| DE | 20 2004 012 953 | 10/2004 |
| DE | 202 21 194 | 6/2005 |
| EP | 1 227 547 | 7/2002 |
| EP | 1 858 122 | 11/2007 |
| FR | 2 613 545 | 10/1988 |
| WO | 2007/126535 | 11/2007 |

OTHER PUBLICATIONS

European Search Report for corresponding Application No. EP 09 00 4242 dated Jul. 22, 2009.
German Search Report for corresponding Application No. 20 2008 014 604.6 dated Jul. 27, 2009.

*Primary Examiner*—Khiem Nguyen
(74) *Attorney, Agent, or Firm*—Renner, Otto, Boisselle & Sklar, LLP

(57) ABSTRACT

The invention concerns an electrical plug connector with an insulating contact carrier that contains a number of electrical contacts in the form of contact pins or contact sockets that are arranged parallel to each other, and which can be inserted axially into a plug connector housing, with the contacts being accessible from the front side of the contact carrier, and with the contacts having connecting elements on a rear side of the contact carrier for a connection with electrical power supply lines. The invention proposes to divide the plug connector housing in the insertion direction into a front and a rear housing section that are connected to a hinge joint by means of a swivel axle that is oriented orthogonally to the insertion direction. In a straightened operating position of the plug connector housing, the axially inserted contact carrier that at least partially engages the two housing section and is in lateral contact with said housing sections at least is some sections reliably prevents the swiveling of the housing sections and therefore the opening of the plug connector housing.

8 Claims, 4 Drawing Sheets

Fig. 4

ELECTRICAL PLUG CONNECTOR

CROSS-REFERENCE TO RELATED APPLICATIONS

The present application claims priority under 35 USC §119 to German Patent Application No. 20 2008 014 604.6, filed on Nov. 4, 2008, the entire disclosure of which is incorporated herein by reference.

TECHNICAL FIELD OF THE INVENTION

The invention concerns an electrical plug connector with an insulating contact carrier that contains a number of contacts in the form of contact pins or contact sockets, arranged parallel to each other, and that can be inserted axially into a plug connector housing, with the contacts being accessible from the front side of the contact carrier, and with the contacts having connecting elements on the rear side of the contact carrier for connecting with electrical power supply lines.

DESCRIPTION OF THE RELATED ART

Among other things, such plug connectors can be used for supplying voltage to consumers of polyphase current, in particular polyphase motors whose correct function depends on the correct connection of the power supply. It is commonly known that the direction of rotation and the power of polyphase motors are determined by the type of connection. Common types of connections for polyphase motors that are known to a person skilled in the art are the delta and the star connection.

Dealers commonly offer polyphase motors without electrical power cables and frequently in non-configured condition in order to reduce the variety of motor types they must keep in stock. In polyphase motors, the ends of the winding conductors are usually accessible in a motor connection box provided on the motor housing in order to connect them to the electrical supply lines of a rotary current supply. In such motors, the electrical connection and the configuration are frequently made via connecting terminal blocks located in the motor connection box. In order to simplify the work for making the connection and to reduce the time required for this, it has become common practice to design the connecting terminal blocks as connecting plugs with an appropriate number of contacts that are continued to the outside on the motor connection box. A connector with contact sockets can be inserted and locked into the connecting plug. The electrical supply lines of the rotary current supply reach the connector by means of a power cable and can be connected to the sockets in the required sequence and to the required bridge configuration.

The electrical power cable with the connector can be prepared by an electrician independently of the installation of the motor so that after the installation of the motor, the motor can be electrically connected and disconnected quickly, simply, and safely without the assistance of an electrician. For the sake of human protection, the supply lines and the bridges are connected to the sockets in an enclosed connection chamber of the connector into which the electrical power cable enters via a cable bushing. In order to provide access to the electrically safe connection chamber, the housing of such a connector usually has a removable housing cover or some such device that is usually bolted to the connector housing. For safety reasons, a tool such as a screwdriver is required for removing the housing cover.

It is considered to be a disadvantage of such a connector that, on the one hand, it is time-consuming to gain access to the electrically safe connection chamber of the plug connector, and that, on the other hand, the plug connector housing, the housing cover, and often also the attachment screw can be completely separated from each other which poses the danger that the housing cover and/or the attachment screw can be misplaced or lost. In any case, all this requires additional time which is undesirable. Also, an attachment screw projecting into the connection chamber reduces the storage space for the ends of the electrical supply lines, especially in small embodiments of the plug connector.

SUMMARY OF THE INVENTION

The invention addresses the problem of proposing a different method that would allow a simple, quick, and safe implementation of various required variants of connections of electrical supply lines to the electrical contacts of the connector.

When viewed in the insertion direction, the plug connector housing of the electrical plug connector according to the invention has a front and a rear housing section that are connected to each other by means of a hinge joint with a swivel axle that is orthogonal to the insertion direction, and can be swiveled from an angled assembly position to a straightened operating position of the plug connector housing, and vice versa. In the operating position, the contact carrier that can be axially inserted into the plug connector housing can be positioned in the housing sections in such a way that it reliably prevents the swiveling of the housing parts, i.e. an opening of the plug connector housing when in an effective position. In the effective position, the contact carrier engages the front and the rear housing section at least partially, and makes contact laterally, at least in sections, with the inside surfaces of the housing sections, in particular such inside surfaces of the front and of the rear housing sections that do not extend orthogonally to the swivel axle of the plug connector housing.

Preferably, the front and the rear housing section are swivelably connected to each other, in such a way that, in the unlocked condition of the two housing sections, the rear housing section can be swiveled by approximately 90 degrees or more relative to the front housing section.

Preferably, the insulating contact carrier of the plug connector that has a number of electrical contacts arranged parallel to each other can be inserted axially into the plug connector housing in the direction opposite to the insertion direction of the plug connector. With the front housing section extending laterally from the rear housing section, the contact carrier can be inserted axially front side first from behind, or rear side first from the front into the front housing section. As an alternative, with the plug connector housing in its angled assembly position, it can be inserted axially rear side first into the rear housing section. However, this variant requires that the rear housing section will accept the entire contact carrier, at least without connected supply lines. After the contact carrier has been inserted, it is held and, advantageously, axially guided on its outer circumference, at least by sections, by the front housing section or the rear housing section. In order to close the plug connector housing, the rear side of the front housing section must not protrude beyond the rear housing section and/or the front side of the contact carrier must not protrude beyond the front housing section in the direction of the rear housing section. If that were the case, the housing sections could not be swiveled into the operating position and the plug connector housing could not be closed. In the operating position, the contact carrier can be shifted to the effective position in which it does not permit the swiveling of the housing sections and therefore the opening of the plug connector housing.

Preferably, in straightened condition, both housing sections can be fastened to each other at their face sides by the contact carrier. In order to fasten the two housing sections to each other, the contact carrier is moved axially into the effective position, with the plug connector housing closed, until—in the insertion direction—a rear section of the contact carrier positively covers the rear housing section and—in the insertion direction—a front contact carrier section positively covers the front housing section—at least in some areas—, both doing so from below. In this position of the contact carrier relative to the plug connector housing, the front housing section and the rear housing section positively cover a central contact carrier section from above, also at least in some areas. The positive engagement of the central contact carrier section in the front housing section and the corresponding engagement of the rear contact carrier section in the front housing part section of the rear housing section reliably and permanently prevent the two housing sections from swiveling. When both housing sections are locked, the rear contact carrier section does not extend up to—in the insertion direction—a rear housing part section of the rear housing section so that a cavity remains in the rear housing section as connection chamber of the electrical plug connector.

The electrical plug connector according to the invention may consist of a plug connector with any kind of cross-sectional shape. For special applications, for example as motor plug connector, a flat connector with essentially rectangular cross-section may serve especially well. In all geometric designs of the plug connector according to the invention, the electrical supply lines may be connected either when the contact carrier is separated from the plug connector housing or when it is housed in the front housing section, with the two housing sections of the plug connector in an angled position relative to each other. This offers free access to the connecting elements of the contacts, located on the rear side of the contact carrier, for their connection to the electrical supply lines, and also to the connection chamber for stowing the ends of the electrical supply lines.

After the connection configuration has been completed, and, if necessary, after the insertion of the contact carrier into the front or the rear housing section, the electrical plug connector, in order to close the connection chamber, is put in the straightened condition and thereafter protected from a swiveling of the housing sections by shifting the contact carrier until the central contact carrier section is located opposite the swivel axle of the plug connector housing. In this condition, the swivel joint between the two housing sections is blocked, thereby providing for a rigid connection of the front and the rear housing sections. In order to reliably prevent the contact carrier from shifting inside the plug connector housing or out of the same, especially when the plug connector is being inserted, it is necessary to fasten the contact carrier non-permanently to at least one of the two housing sections. This can be accomplished, for example, by means of a screw connection, a latch arrangement, or some other suitable measure.

It was found that it is of advantage for connecting operations if the contact carrier of the electrical plug connector is held by the front housing section. This significantly simplifies the connection of the electrical supply lines to the connecting elements of the electrical contacts located on the rear side of the contact carrier. It has the additional advantage of rendering the contact carrier captive.

Preferably, the contact carrier is mounted in the front housing section to be axially shiftable in the insertion direction as well as in the opposite direction in such a way that, when the two housing sections are in alignment with each other, the contact carrier can be shifted in centered condition in a simple manner and without problems from the front housing section to the rear housing section and vice versa, until the rear contact carrier section of the contact carrier engages the rear housing section and the front contact carrier section engages the front housing section from below.

Also, preference is given to an embodiment of the invention where the contact carrier, by means of radial latch-locking in the axial direction in the plug connector housing, can be fixed in position non-permanently in relation to the housing sections.

Preferably, this is accomplished by means of complementary latching elements on the contact carrier and at least one of the housing sections. It serves the purpose if the contact carrier latch-locks automatically in the plug connector housing when the corresponding latching elements reach a matching position. Unlatching is performed manually when necessary, by simply disengaging the latching elements with a tool from the front side of the contact carrier if the plug connector housing is to be opened. In principle, the contact carrier can be latch-locked with the front housing section, the rear housing section, or both housing sections of the plug connector housing. Latch-locking in the rear housing section in particular results in additional stability regarding the bending of the front housing section.

In one embodiment of the electrical plug connector, the plug connector housing has an enclosed coding chamber that is separated from the connection chamber and in which a bridge configuration of the electrical contacts of the plug connector can be performed. This is an advantage especially when the electrical plug connector is to be used for making a connection to a polyphase motor. By means of the bridge configuration, it is simple to select the operating mode of the motor in delta or star connection without changing the sequence of the supply lines relative to the electrical contacts in the connection chamber. This also offers the advantage that no additional steps need to be taken on the motor itself in order to select the operating mode and the direction of rotation of the polyphase motor.

In an advantageous embodiment, the bridge configuration takes the form of an internal plug connection that is made in the coding chamber, preferably by means of a coding plug. The bridging of certain electrical contacts is performed preferably by means of stamped and/or bent wire and/or stamped and bent parts serving as electrical bridges that are prefabricated in an appropriate grid dimension and are included with the plug connector. This makes it possible in a simple way to establish the electrical connection quickly and positively between the contacts. This also makes it possible to change the operating mode quickly and without problems. Preferably, the bridging elements are embedded in a plastic carrier that also prevents the wrong polarity regarding the electrical contacts.

In another embodiment of the plug connector according to the invention, each of the electrical contacts has a spring terminal as connecting element for attaching the electrical supply lines. The spring terminals are actuated via a terminal plunger that protrudes beyond the rear side of the contact carrier, which makes it especially easy to connect the supply lines to or disconnect them from the electrical contacts.

Below, the invention is explained in detail with reference to an embodiment shown in the drawing. Additional characteristics of the invention are given in the following description of the embodiment of the invention in conjunction with the claims and the attached drawing. The individual characteristics of the invention can be implemented by themselves or in combinations of several in different embodiments of the invention.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The embodiment shown in the figures describes an electrical plug connector according to the invention in which the contact carrier is guided in the front housing section in an axially shiftable way and can be locked, specifically latch-locked, therewith in order to hold it in the effective position.

Figure 1:
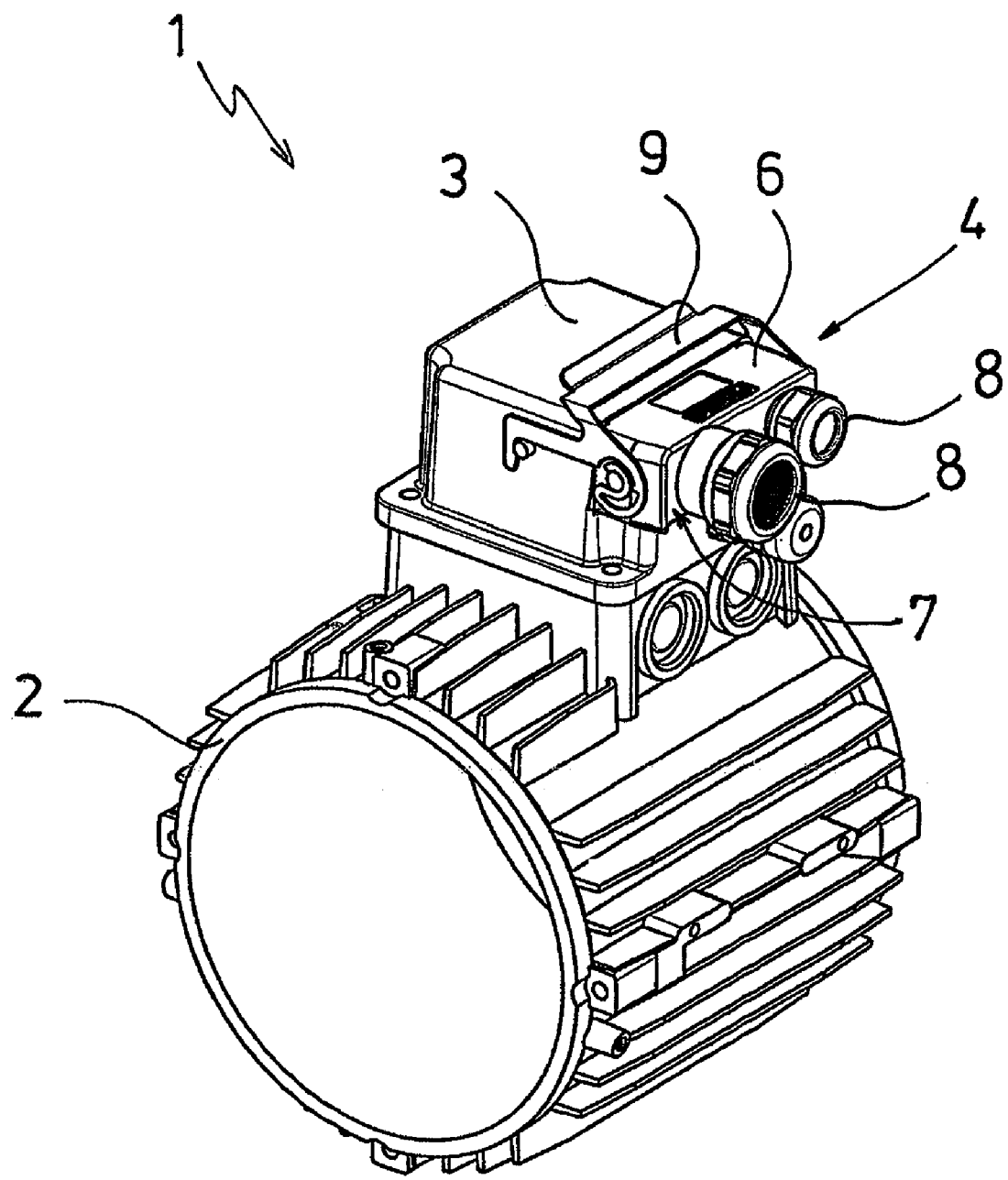
FIG. 1 shows a perspective view of a polyphase motor with connecting plug on to which a plug connector according to the invention designed as a coupling element has been mounted.

FIG. 1 shows a polyphase motor 1 with a motor housing 2 to which a connecting plug 3 is attached on the outside. Contacts (not visible in FIG. 1) of the connecting plug 3 are connected in an electrically conductive way to the winding conductors of the motor 1. Power is supplied to the polyphase motor 1 via a plug connector 4 according to the invention, designed as a coupling element, with the connecting plug 3 and the plug connector 4 being plugged together. The plug connector 4 is connected to a rotary current supply by means of electric supply lines (not shown in the figure). In order to insert the supply lines into the plug connector housing 6, the plug connector 4 has two cable bushings 8 at a rear end 7. The plug connector 4 and the connecting plug 3 are locked together by means of a locking clip 9 with spring-action that is swivelably attached to the connector housing 6.

Figure 2:
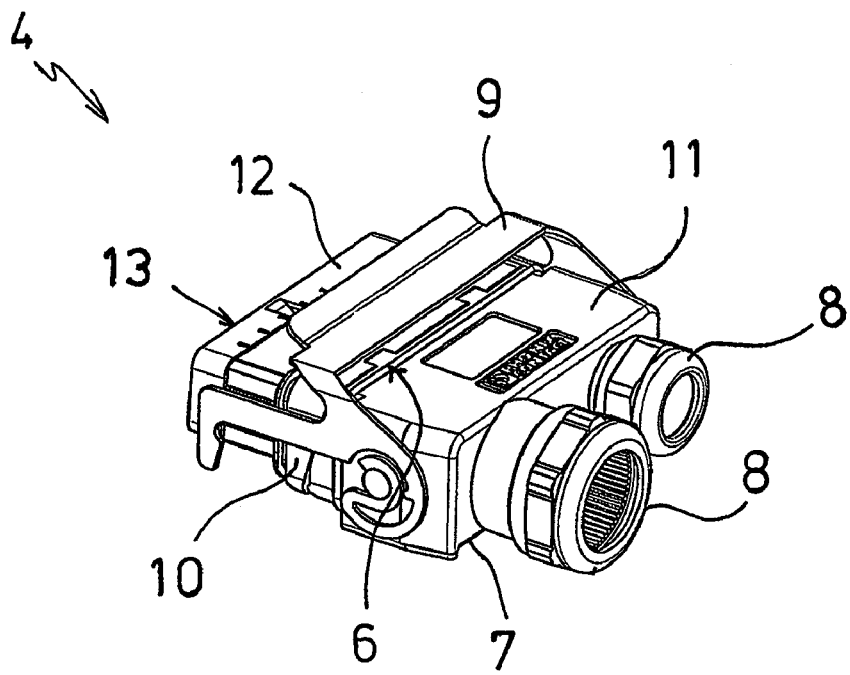
FIG. 2 shows a perspective view of the plug connector in FIG. 1 with the plug connector housing closed.
Figure 3:
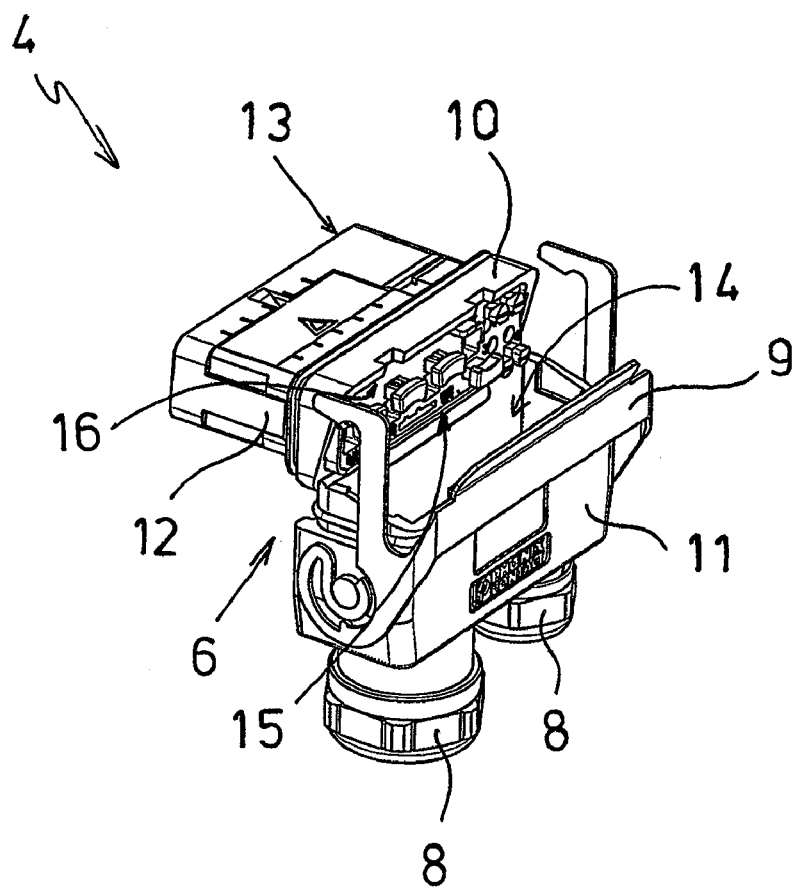
FIG. 3 shows a perspective view of the plug connector in FIG. 2 with the plug connector housing open.

FIG. 2 shows the plug connector from FIG. 1, enlarged and detached from the polyphase motor 1, in a view from above towards the rear end 7. The plug connector housing 6 has a front housing section 10 and a rear housing section 11 that, as shown in FIG. 3, are able to swivel in relation to each other. A contact carrier 12 with electrical contacts located therein (not visible in the drawing) is located in the plug connector housing 6, protruding beyond the front housing section 10. The design of the front side 13 of the contact carrier 12 is complementary to that of the insertion side of the connecting plug 3.

FIG. 3 shows the plug connector housing 6 shown in FIG. 2 in the open condition. The two housing sections 10, 11 of the plug connector housing 6 are joined with the ability to swivel. Via a swivel axle 21 oriented orthogonally to the insertion direction and only shown in the FIGS. 4a-4c, the rear housing section 11 is swiveled approximately 90 degrees relative to the front housing section 10 so that access is provided to a connection chamber 14 of the plug connector 4 as well as to the connecting elements 15 of the electrical contacts (not visible) on the rear side 16 of the contact carrier 12. When the plug connector housing 6 is open, the contact carrier 12 protrudes beyond the front housing section 10 further than when the plug connector housing 6 is closed.

The contact carrier 12 that is guided in the front housing section 10 with the ability to shift axially in the insertion direction and in the opposite direction acts like a lock when it is inserted a certain way into the rear housing section 11, securely locking the two housing sections 10, 11 in the straightened condition of the plug connector 4 shown in FIG. 2. Due to the circumstance that the front housing section 10 in unlocked condition, as can be seen in the FIGS. 4b and 4c, only covers a rear section 17 of the contact carrier 12 from above, the enclosed coding chamber 19 located in a central section 18 of the contact carrier 12 becomes accessible for a bridge configuration. In the locked condition of both housing sections 10, 11 of the plug connector housing 6 shown in FIG. 4a, the front housing section 10 bars the access to the coding chamber 19 by at least partially covering the enclosed coding chamber 19 from above.

Figure 4:
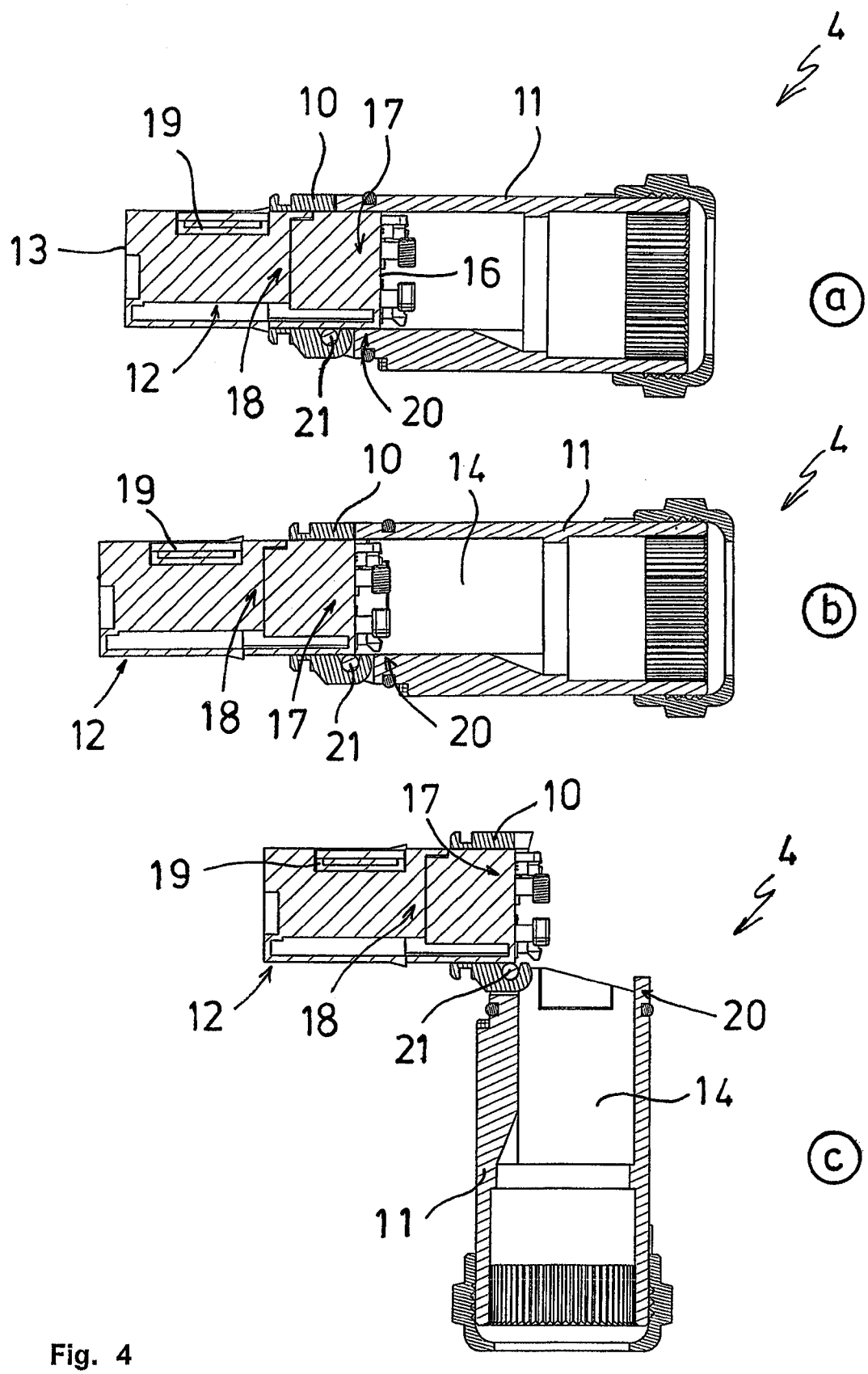
FIG. 4 shows a longitudinal section view of the plug connector in FIG. 1 in locked condition (FIG. 4a), in unlocked condition (FIG. 4b), and in open condition (FIG. 4c)

FIGS. 4a-4c show the opening of the plug connector housing 6 step by step in longitudinal section views. The closing of the plug connector housing 6 is performed in the reverse order.

FIG. 4a shows the front 10 and the rear 11 housing section of the plug connector housing 6 in straightened condition and locked with each other. With its rear contact carrier section 17, the contact carrier 12 engages a front housing section part 20 of the rear housing section 11. With its front housing section part 20, the rear housing section 11 positively covers the contact carrier 12 from above, at least in some areas. Also, the front housing section 10 positively covers at least some sections of the contact carrier section 18 from above so that the access to the coding chamber 19 in the central contact carrier section 17 is ensured.

FIG. 4b shows the plug connector 4 from FIG. 4a in unlocked condition but otherwise unchanged. In the insertion direction of the plug connector 4, the contact carrier 12 is pulled far enough from the front housing section part 20 of the rear housing section 11 that the rear contact carrier section 17 is only covered by the front housing section 10 from above. As a consequence, the two housing sections 10, 11 are no longer locked together. Also, the access to the coding chamber 19 is now no longer barred by the front housing section 10. Now, the front housing section 10 can be swiveled by up to 90 degrees or more relative to the rear housing section 11. For this purpose, the two housing sections 10, 11 are joined movably by means of a swivel axle 21 oriented orthogonally to the insertion direction.

FIG. 4c shows the plug connector 4 according to the invention in folded-open condition. The front housing section 10 extends essentially perpendicular to the rear housing section 11. The connection chamber 14 that is closed when the housing sections 10, 11 are in straight alignment is now accessible. Also, the connecting elements 15 on the rear side 16 of the contact carrier 17 can be reached in this position.

Figure 5:
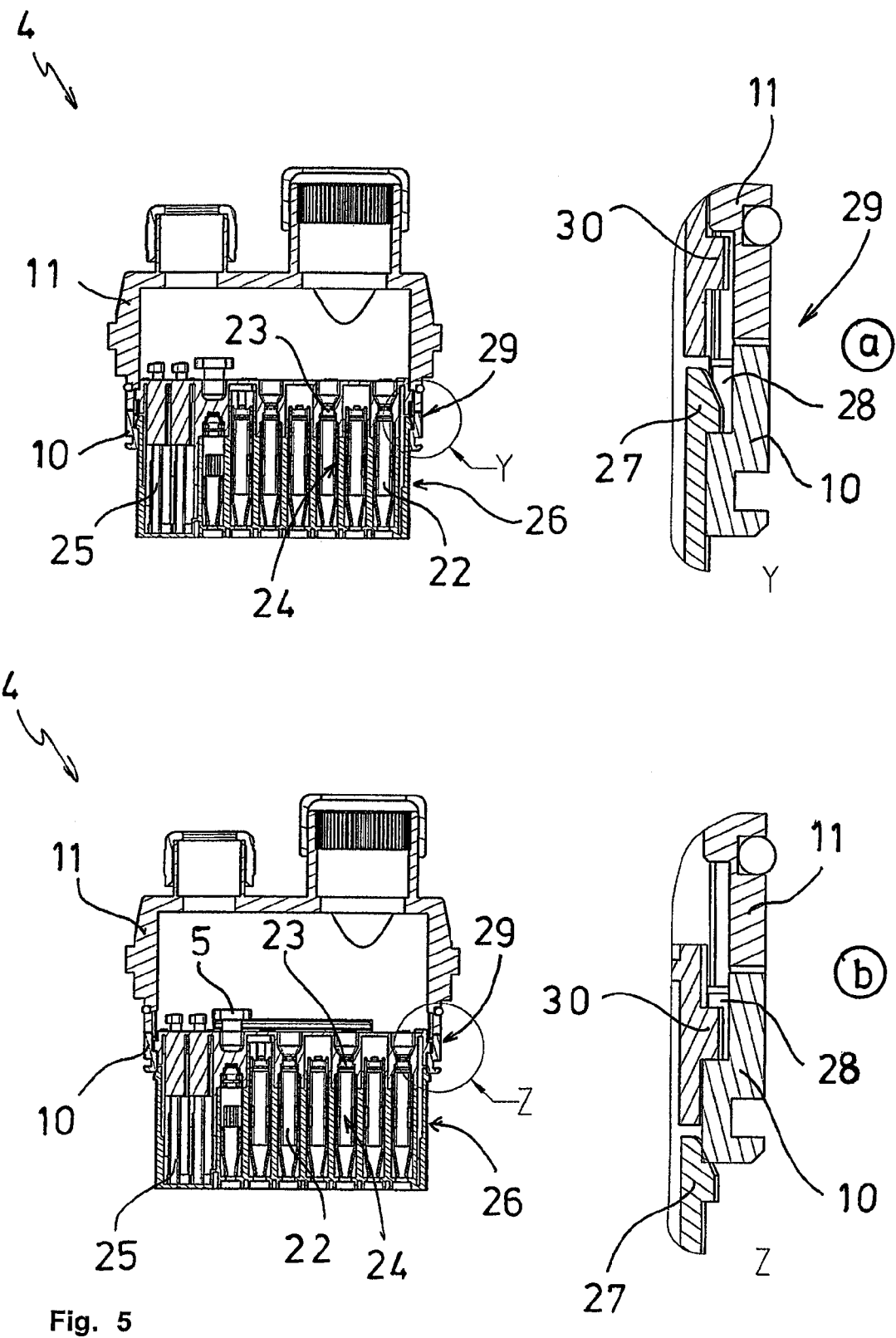
FIG. 5 shows an axial section view of the contact carrier of the plug connector in FIG. 1 with the electrical contacts located therein, held in the plug connector housing in locked condition (FIG. 5a) and in unlocked condition (FIG. 5b).

FIG. 5 shows the plug connector 4 from the FIGS. 4a and 4b, but in a top view of the coding chamber 19 in sectional representations. FIGS. 5a, 5b show a number of electrical contacts that are visible in a side-by-side arrangement in the contact carrier 12. They extend parallel to each other from the rear side 16 to the front side 13 of the contact carrier 12. The contact carrier 12 is inserted into the plug connector housing 6 that is composed of the front housing section 10 and the rear housing section 11 which are arranged in a straight configuration. In the rear housing section 11, the connection chamber 14 is formed, with electrical supply lines (not shown) leading to said chamber through the cable bushings 8.

On the rear side 16 of the contact carrier 12, the electrical contacts 22 have spring terminals 23 for the connection with the electrical supply lines, and in the central contact carrier section 18 they have contact sockets 24 for the bridge configuration in the coding chamber 19. In addition, pass-through elements 25 for control lines are arranged next to the electrical contacts 22. Like the contacts 22, the pass-through elements 25 have spring terminals 25 for the connection of the control lines, and the spring terminals 25 can be actuated by terminal plungers 25.

On opposite lateral surfaces 26 of the contact carrier 12, latching hooks 27 are molded in that interact with latching recesses 28 in the front housing section 10 for locking the housing sections 10, 11 together. In the locked condition, shown in FIG. 5a, the latching hooks 27 engage the latching recesses 28. Together, the latching hooks 27 and the latching recesses 28 are referred to as latching elements 29. In the enlarged detail Y of the FIG. 5a, the latching elements 29 are shown enlarged so that the design of the latching elements 29 and their engagement are clearly visible. Here, the front housing section 10 positively covers the central contact carrier section 18, and the rear housing section 11 positively covers the rear contact carrier section 17 at the circumference. This locks the two housing sections 10, 11 together in a stable position, and the lock is non-permanently secured by means of the latching elements 19.

FIG. 5b shows the plug connector 1 in the unlocked and straightened condition. The latching elements 29 are disengaged, as can be seen from the enlarged detail Z of FIG. 5b. In addition, compared with the representation in FIG. 5a, the contact carrier 12 is shifted in the insertion direction of the plug connector 1 relative to the plug connector housing 6. Now, the rear contact carrier section 17 no longer engages the rear housing section 11. It is held in its entirety by the front housing section 10. This disengages the locking of the two housing sections 10, 11 of the plug connector housing 6 so that the front housing section 10 can be swiveled in relation to the rear housing section 11, or vice versa, in order to open the plug connector housing 6. On the rear contact carrier section 17, a holding collar 30 is molded in behind the latching hook 27 in the insertion direction of the plug connector 4 that holds the contact carrier 12 in unlocked condition on the front housing section 10.

Further features of the invention can be found in the description of preferred embodiments of the invention in connection with the claims and the drawings. The single features can be realised alone or several together in embodiments of the invention.

The invention claimed is:

1. An electrical plug connector with an insulating contact carrier that contains a number of electrical contacts in the form of contact pins or contact sockets that are arranged parallel to each other, and which can be inserted axially into a plug connector housing, with the contacts being accessible from the front side of the contact carrier, and with the contacts having connecting elements on a rear side of the contact carrier for connecting with electrical power supply lines, wherein, in the insertion direction, the plug connector housing has a front and a rear housing section that are connected to each other by means of a hinge joint with a swivel axle that is oriented orthogonally to the insertion direction, and can be swiveled from an angled assembly position to a straightened operating position of the plug connector housing, and vice versa, with the contact carrier, the plug connector housing being in operating position, being positionable in the housing sections in such a way that, when in effective position, it engages the front housing section and the rear housing section at least partially and makes contact laterally, at least in sections, with the inside surfaces of the housing sections, thereby reliably preventing the swiveling of the housing parts.

2. The electrical plug connector as claimed in claim 1, wherein the contact carrier is guided in an axially shiftable way in the front housing section and/or the rear housing section.

3. The electrical plug connector as claimed in claim 1, wherein in the straightened condition, the two housing sections can be locked together by the contact carrier.

4. The electrical plug connector as claimed in claim 3, wherein the contact carrier has latching elements whose form is complementary to the front housing section and/or the rear housing section.

5. The electrical plug connector as claimed in claim 1, wherein the contact carrier has an enclosed coding chamber in which a bridge configuration of the contacts can be selected.

6. The electrical plug connector as claimed in claim 5, wherein the bridge configuration has the form of an internal plug connection and can be configured preferably with a coding plug.

7. The electrical plug connector as claimed in claim 1, wherein the front and the rear housing section are swiveably joined in such a way that the rear housing section can be swiveled by approximately 90 degrees or more relative to the front housing section.

8. The electrical plug connector as claimed in claim 2, wherein that in the straightened condition, the two housing sections can be locked together by the contact carrier.

* * * * *